UNITED STATES PATENT OFFICE.

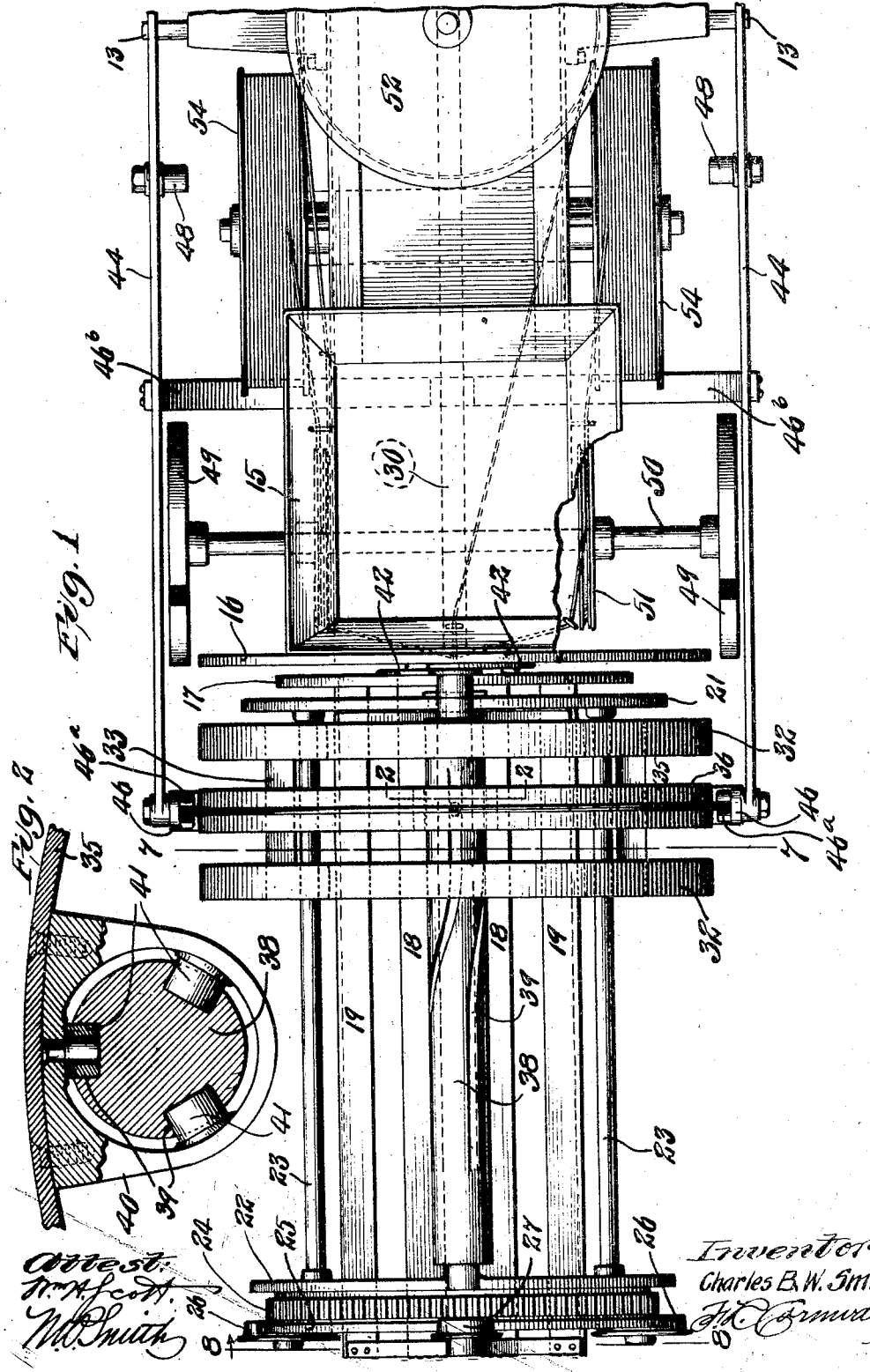

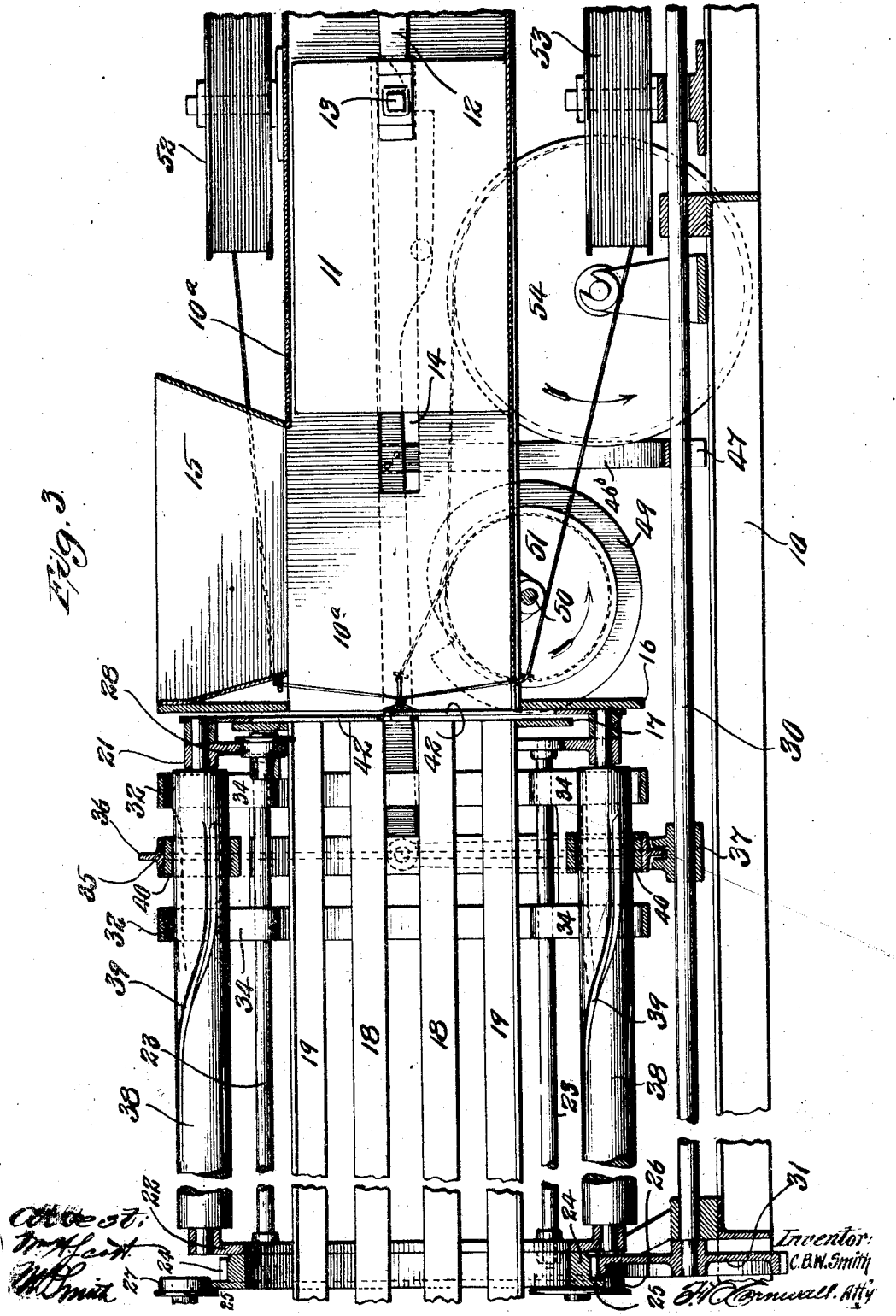

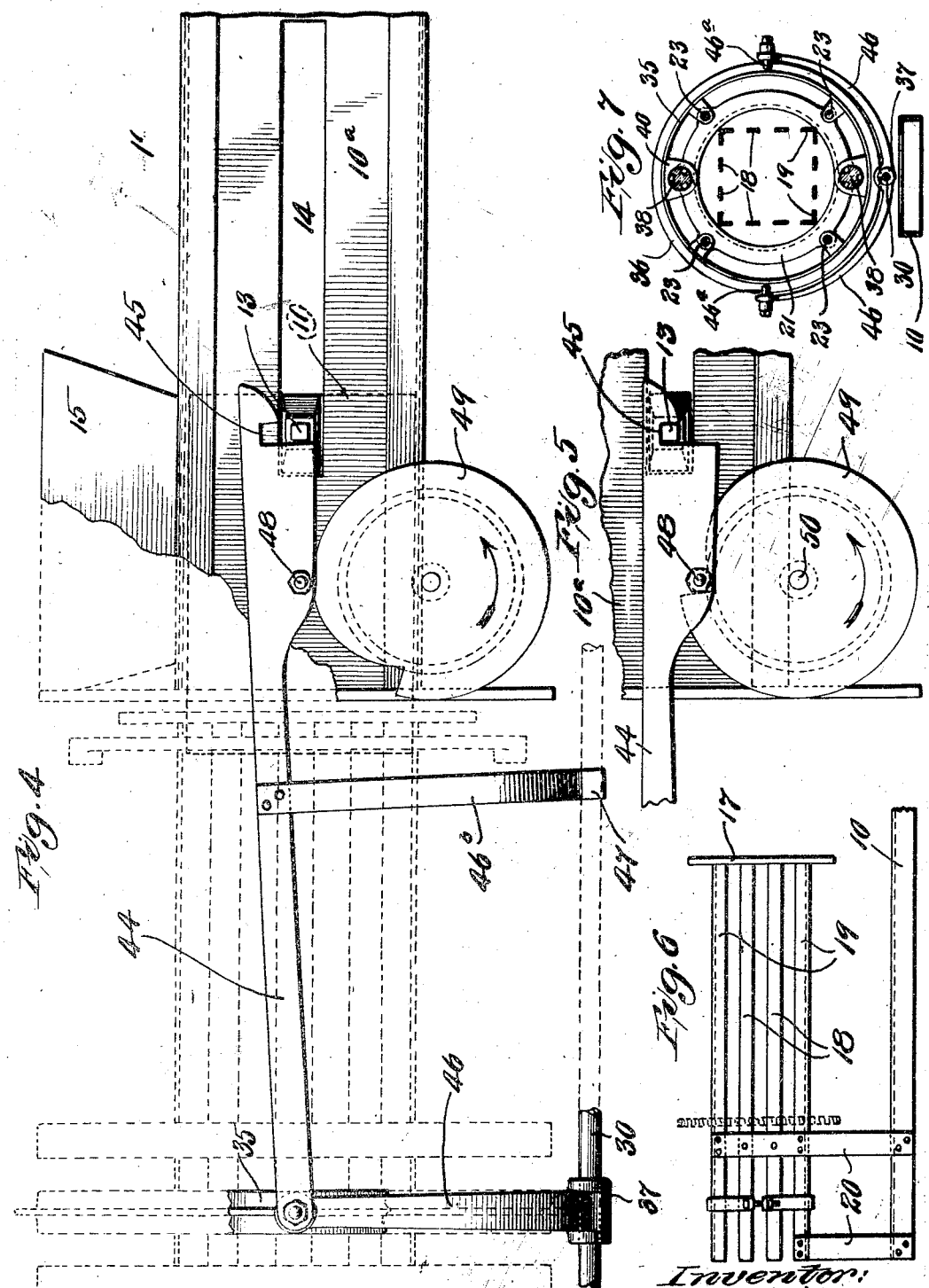

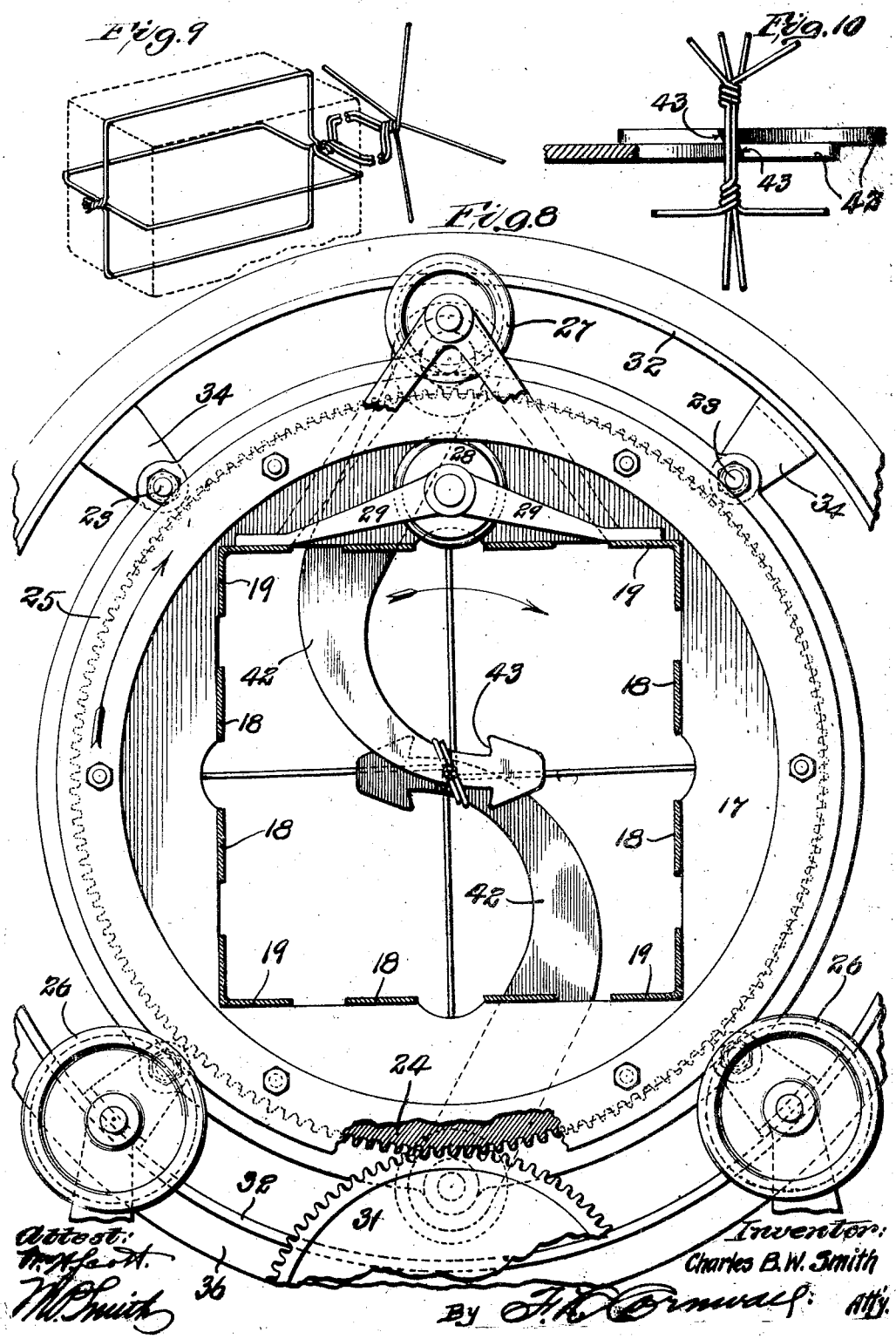

CHARLES B. W. SMITH, OF ST. LOUIS, MISSOURI.

BALING-PRESS.

1,141,088.

Specification of Letters Patent.

Patented May 25, 1915.

Application filed September 28, 1914. Serial No. 863,875.

*To all whom it may concern:*

Be it known that I, CHARLES B. W. SMITH, a citizen of the United States, residing at the city of St. Louis, State of Missouri, have invented a certain new and useful Improvement in Baling-Presses, of which the following is a full, clear, and exact description, such as will enable others skilled in the art to which it appertains to make and use the same, reference being had to the accompanying drawings, forming part of this specification, in which—

Figure 1 is a top plan view of a baling press of my improved construction with parts thereof broken away. Fig. 2 is an enlarged detail section taken approximately on the line 2—2 of Fig. 1. Fig. 3 is a vertical section taken longitudinally through the center of my improved baling press. Fig. 4 is a side elevational view of the press with parts thereof shown in dotted lines. Fig. 5 is a detail elevational view of a cam utilized in my improved press and which cam is instrumental in forming a connection between the plunger and the wire twisting mechanism. Fig. 6 is a side elevational view of the slotted baling chamber forming a part of my invention. Fig. 7 is a reduced cross sectional view taken approximately on the line 7—7 of Fig. 1. Fig. 8 is an enlarged cross sectional view taken approximately on the line 8—8 of Fig. 1. Fig. 9 is a perspective view illustrating the baling wires in position upon a bale, the latter shown in dotted lines, and said wires shown twisted and severed at the end of the bale. Fig. 10 is an enlarged horizontal section taken approximately on the line 10—10 of Fig. 8.

My invention relates to baling presses such as are generally used for compressing and baling hay, straw, excelsior, shavings and the like, the principal object of my invention being to construct a comparatively simple, inexpensive and efficient baling press which is wholly automatic in all its operations, including the applying of the wires to the bales as they are formed, the twisting together of the baling wires on the ends of the bales, and the severing of said baling wires after the ends have been securely and firmly twisted together.

Further objects of my invention are; to construct a baling press so that it is not necessary to place divisional blocks or boards between the bales during the formation of said bales; to provide means for applying a baling wire centrally on each of the four sides of the bale and to twist said baling wires together on the ends of the bale at points substantially in alinement with the medial line of the bale; to provide a machine which will produce bales of substantially uniform size and weight, and which machine consists of comparatively few parts, and which can be operated with comparatively little power.

With the foregoing and other objects in view, my invention consists in certain novel features of construction and arrangement of parts, hereinafter more fully described and claimed.

Referring by numerals to the accompanying drawings which illustrate the preferred form of my invention, 10 designates a suitable base and supported thereupon in any suitable manner and at a slight elevation is a horizontally disposed baling chamber 10$^a$ which is preferably of box shape, and in which operates a plunger 11. This plunger is reciprocated by means of a pitman 12 which is actuated in any suitable manner and projecting from the sides of the plunger are pins or lugs 13 which project through longitudinally disposed slots 14, the same being formed in the side walls of the baling chamber 10$^a$.

Positioned on top of the baling chamber 10$^a$ is a hopper 15 into which the material to be baled is fed, and located on the rear end of said chamber 10 is a disk or plate 16. Located adjacent to this disk or plate is a smaller disk or plate 17 and the space between the two disks or plates is occupied by the arms which draw the baling wires together between the ends of the bales and which arms are hereinafter more fully described.

Fixed to the plate 17 are the inner ends of slats 18 and angle irons 19 which form the slatted portion of the baling chamber. This slatted baling chamber is in direct alinement with and extends rearwardly from the rear end of the baling chamber 10 and the rear portions of the slats forming said slatted chamber are supported by suitable uprights 20, the lower ends of which are fixed to the base 10.

Arranged to revolve about the slatted chamber is a skeleton cage comprising a front ring 21 and a rear ring 22, the same being connected by a series of longitudinally disposed rods 23. Fixed to the rear ring 22 is a toothed ring 24 provided on its outer edge with an integral flange 25, the same bearing upon suitable rollers 26 and 27. The inner edge of the forward ring 21 bears upon a roller 28 which is journaled in a bearing formed on a bracket 29, which latter is mounted on the forward end of the slatted baling chamber.

Journaled in suitable bearings on the base 10 is a longitudinally disposed shaft 30, which is driven in any suitable manner from the forward end of the machine and fixed on the rear end of this shaft is a gear wheel 31 which meshes with the teeth of the ring 24. Encircling the cage formed by the rings 21 and 22 and rods 23 is a pair of rings 32, the same being connected by brackets 33 and the ends of these brackets are extended inward to form bearings 34 which are arranged to slide freely upon the rods 23. Fixed to the central portions of the brackets 33 is a ring 35 provided with an outwardly projecting flange 36 and this flange engages in a slot or notch formed in a block 37, which latter is mounted to slide freely upon the shaft 30.

Journaled in suitable bearings formed on the rings 21 and 22 are the ends of a pair of oppositely arranged longitudinally disposed shafts 38 in the surfaces of which are formed spirally disposed cam grooves 39. Fixed to the inside of the ring 35 are blocks 40 which are provided with openings adapted to receive the shafts 38, and journaled on said blocks are rollers 41, which engage in the grooves 39. Fixed on the forward ends of the shafts 38 are the outer ends of a pair of curved wire twisting arms 42, the inner ends of which are notched so as to provide shoulders 43, the same being sharpened so as to provide cutting edges. (See Fig. 10.) These wire twisting arms are arranged so that their inner portions overlap each other when said arms are swung inwardly and said arms occupy the narrow space between the disks or plates 16 and 17.

Fixed to the block 37 which is loosely mounted on shaft 30 are upwardly projecting arms 46 which occupy positions immediately adjacent to the lower portion of ring 35 and the upper ends of said arms are provided with inwardly projecting pairs of pins 46ª which engage the flange on said ring 35. The central portions of the arms 44 are united by a U-shaped yoke 46ᵇ, the central portion of which is provided with a depending lug 47, the same being notched to receive the rod 30. Fixed to and projecting inwardly from the forward portions of the arms 44 are lugs or pins 48, the same being designed to ride directly upon the peripheries of cam disks 49, which latter are fixed on the ends of a transverse shaft 50. This shaft is journaled in suitable bearings on the underside of the rear portion of the baling chamber 10ª and fixed on said shaft to the sides of the baling chamber 10ª are grooved wheels 51.

Arranged on top of the baling chamber 10ª is a reel 52 of baling wire and the strand of wire from this reel is led forwardly through suitable eyelets or pulleys to the right of the hopper 15 and from the forward end of said hopper this strand of wire extends downward to a central point in the rear end of the baling chamber 10ª.

Arranged beneath the baling chamber 10ª is a reel 53, the wire from which extends rearwardly to the end of the baling chamber 10ª, and thence upwardly to the center of said chamber. Located on the sides of the baling chamber 10ª are reels 54, the wire from which extends rearwardly and passes once around the grooved wheels 51 which are mounted on shaft 50 and from thence these wires are extended through suitable eyelets or pulleys to the center of the baling chamber where they unite with the wires from the reels 52 and 53.

The operation of my improved baling press is as follows: Under normal conditions, the rings 32 and 35 occupy positions near the rear end of the slatted baling chamber and around the rear portions of the shafts 38 with the rollers 41 positioned in the straight rear portions of the grooves 39. When so positioned, the curved arms 42 are swung outward so as to be entirely outside the space within the baling chambers. When so positioned, the pins 48 on the arms 44 rest upon the high or normal edges of the cam disks 49 as shown in Fig. 4. Thus, the notches 45 in the arms 44 are elevated with respect to the pins or lugs 13 on the plunger and consequently, the plunger can reciprocate to compress the material fed into the baling chamber 10ª without affecting any of the wire applying or twisting parts of the press. It will be understood that before starting the press, the ends of the four wires are brought together at the center of the baling chamber, and said ends being united in any suitable manner, preferably by being twisted together. The material to be baled is fed into the hopper 15, and on the forward stroke of the plunger 11, this material is forcibly pressed against the wires which extend across the end of baling chamber 10ª. This pressure naturally forces the ends of the wire and the compressed charge of material a short distance into the forward end of the slatted baling chamber and as a result, the wires which pass around the grooved wheels 51 partially rotate said wheels, therewheels by partially rotating shaft 50 and likewise by partially rotating the cam disks 49. During such movement, the pins 48 ride on the high or normal portions of the disks 49, and which normal portions extend around approximately seven-eighths (⅞) of the circumference of said disks.

As material is fed into the baling chamber 10ᵃ it is compressed under the forward strokes of the plunger 11, and the bale thus formed is slowly forced into the slatted baling chamber, during which time the baling wires unwinding from the various wheels are drawn tautly along the sides of said bale. The shaft 50 is intermittently rotated by the unwinding action of the two wires which encircle the wheels 51 until the disks 49 have made a complete revolution at which time the pins 48 drop off the shoulders formed in the edges of said disks, thus permitting the free ends of the arms 44 to drop in the position illustrated in Fig. 5. This brings the notches 45 in the ends of the arms 44 into position to be engaged by the pins 13 on the sides of the plunger and on the next forward stroke of said plunger, said pins will engage in the notch 45 and on the succeeding rearward movement of the plunger, the arms 44 and parts carried thereby will be drawn rearwardly with the plunger, and as said arms 44 are connected to the ring 35, said ring together with the rings 32 will be drawn to the forward end of the slatted baling chamber. During this movement, the rollers 41 traversing the spirally disposed grooves 39 will effect a partial rotation of the shafts 38, and as a result the curved arms 42 will be swung inward, thereby engaging all of the baling wires at the rear end of the bale just formed, and said wires will be carried to the center of the baling chamber as shown in Fig. 8.

It will be understood that shaft 30 rotates continuously, thereby imparting rotary movement through gear wheel 31 and toothed ring 24 to the cage comprising rings 21 and 22 and rods 23. When the movements have been effected to swing the inner ends of arms 42 inwardly, as shown in Fig. 8, and as just described, the rotary motion of the cage imparted to the curved arms will twist the baling wires together at a central point within the baling chamber and against the end of the bale just formed. (See Fig. 9.)

As the arms 42 move inward to draw the baling wires across the ends of the completed bale, a certain amount of wire will be drawn from the reels and consequently, the shaft 50 will be partially rotated owing to the passage of certain of the baling wires around the grooved wheels 51, and thus the eccentric disks 49 will be moved to the position shown in Fig. 4. As a result, the pins 48 carried by the arms 44 will on the next forward movement of the plunger ride onto the high or normal edges of said disks, thereby elevating the notches 45 so that the pins 13 are disengaged therefrom. The plunger 11 will now continue to operate in the usual manner to compress the charges fed into the baling chamber until another bale has been formed at which time, the disks 49 will have been completely rotated, thereby effecting a succession of the movements just described.

On the return movement of the plunger after the rings 32 and 35 have been drawn to the rear end of the slatted baling chamber, said rings will be moved to the forward end of said slatted baling chamber, or to their normal positions as seen in Fig. 4, thereby effecting a reverse movement of the shafts 38, and as a result of such reverse movement, the arms 42 will be swung outward to their normal positions and at the beginning of such outward swinging movement, the sharpened edges of the shoulders 43 on the ends of said arms will cut the baling wires at a central point in the loop formed between the twisted portions, thereby leaving twisted ends at the center of the bale just formed and twisting the ends of the wires together for the succeeding bale. (See Figs. 9 and 10.)

A baling press of my improved construction is comparatively simple, is entirely automatic in all its operations, forms bales of uniform size and weight, and can be operated with comparatively little power.

It will be readily understood that minor changes in the size, form and construction of the various parts of my improved baling press can be made and substituted for those herein shown and described, without departing from the spirit of my invention, the scope of which is set forth in the appended claims.

I claim:

1. A baling press provided with a baling chamber and a compressing plunger, baling wires which are adapted to enter the baling chamber and move rearwardly therethrough as the bale is formed, and automatically operating means normally outside the baling chamber and adapted to enter said chamber on opposite sides thereof for twisting said wires together at the end of the bale.

2. A baling press provided with a baling chamber and with a compressing plunger operating therein, baling wires adapted to feed into the baling chamber as the bale is formed therein, means normally outside the baling chamber and adapted to enter said chamber on opposite sides thereof for twisting said wires together at the end of the bale, and means controlled by the plunger for actuating the wire twisting means.

3. A baling press provided with a baling chamber and a compressing plunger operating therein, baling wires adapted to enter the baling chamber and to feed rearwardly therein as the bale is formed, automatically operating means for twisting said baling wires together at the end of the bale, and means controlled by certain of the baling wires for effecting a movement of the wire twisting means.

4. A baling press provided with a baling chamber, means for compressing material therein, baling wires adapted to feed into the baling chamber along the sides of the bale as the same is formed, and automatically operating means normally outside the baling chamber and adapted to enter said chamber on opposite sides thereof for twisting and severing said wires at the end of the bale.

5. A baling press provided with a baling chamber, means for compressing material therein, baling wires adapted to feed into the baling chamber along the sides of the material compressed in said chamber, and means normally on the exterior of said baling chamber, which means is adapted to enter said baling chamber at the end of the bale and twist the baling wires together and to sever said baling wires after the same have been twisted.

6. A baling press provided with a baling chamber, a plunger arranged for operation therein, baling wires adapted to feed into the baling chamber along the sides of the bale as the same is formed, means normally positioned on the exterior of the baling chamber adapted to enter said baling chamber to draw the baling wires together on the end of the bale, and means for revolving said wire drawing means to twist said wires together at the end of the bale.

7. A baling press provided with a baling chamber, a compressing plunger arranged for operation therein, baling wires adapted to enter the sides of the chamber and to engage the sides of the bale formed therein, and means for drawing said wires together to a central point on the ends of the bale and twisting said wires together.

8. A baling press provided with a baling chamber, a compressing plunger arranged for operation therein, baling wires adapted to enter the sides of the chamber and to engage the sides of the bale formed therein, and means for drawing said wires together to a central point on the ends of the bale, twisting said wires together, and severing said wires after the same have been twisted together.

9. A baling press provided with a baling chamber, a compressing plunger arranged for operation therein, baling wires adapted to feed into said baling chamber and engage the sides of the bale as it is formed, means adapted to enter the baling chamber and draw the baling wires to a central point on the end of the bale, means for revolving said wire drawing means to twist the wires together on the end of the bale, and means controlled by certain of the baling wires for effecting a movement of the last mentioned means.

10. A baling press provided with a baling chamber, means for compressing material into a bale in said chamber, baling wires adapted to feed into said chamber along the sides of the bale, automatically operating means for bringing the baling wires together on the end of the bale, means engaged by certain of the baling wires for effecting a movement of the last mentioned means, and means for severing the baling wires after the same have been brought together at the end of the bale.

11. A baling press provided with a baling chamber and a compressing plunger, baling wires which are adapted to enter the baling chamber, and move therethrough along the sides of the bale as the same is formed, means adapted to revolve about the baling chamber, and means coöperating with said revolving means for entering the baling chamber for twisting the baling wires together at the end of the bale.

12. A baling press provided with a baling chamber and a compressing plunger, baling wires which are adapted to enter the baling chamber and move therethrough along the sides of the bale as the same is formed, means adapted to revolve about the baling chamber, and means coöperating with said revolving means for entering the baling chamber for twisting the baling wires together at the end of the bale, and severing said wires after the twist has been made.

13. In a machine of the class described, bale forming means, baling wires which are adapted to feed along the sides of the bale when the same is being formed, means adapted to enter the baling chamber to draw the baling wires together on the end of the bale, means for revolving said wire drawing means to twist said wires together, and means for moving said wire drawing means apart to sever the baling wires after the twist has been made.

14. A baling press comprising a baling chamber, means for compressing material therein, means adapted to revolve about the baling chamber, and baling wire engaging means coöperating with said revolving means and adapted to enter the baling chamber to draw the baling wires together at the end of the bale.

15. A baling press comprising a baling chamber, means for compressing material therein, means adapted to revolve about the baling chamber, and baling wire engaging means coöperating with said revolving means and adapted to enter the baling chamber to draw the baling wires together, twisting said wires together and severing said wires after the same have been twisted.

16. In a machine of the class described, a baling chamber, a plunger arranged for operation therein, means adapted to revolve about the baling chamber, wire engaging arms coöperating with said revolving means, which arms are adapted to enter the baling chamber to draw the wires together at the end of the bale, and means controlled by the amount of wire fed into the baling chamber for effecting a movement of the wire engaging arms.

In testimony whereof I hereunto affix my signature in the presence of two witnesses, this 24th day of September, 1914.

CHARLES B. W. SMITH.

Witnesses:
M. P. SMITH,
M. A. HANDEL.